United States Patent

[11] 3,594,625

[72] Inventor Raymond H. Richardson
 Chicago, Ill.
[21] Appl. No. 854,217
[22] Filed Aug. 29, 1969
[45] Patented July 20, 1971
[73] Assignee Interlake Steel Corporation

[54] DUAL SPEED MOTOR CONTROL
 10 Claims, 1 Drawing Fig.
[52] U.S. Cl. .................................................... 318/257,
 318/268, 318/305, 318/442
[51] Int. Cl. .................................................... H02p 7/54
[50] Field of Search .......................................... 318/257,
 268, 305

[56] References Cited
 UNITED STATES PATENTS
 3,078,406 2/1963 Zweifel et al. ................ 318/305

3,140,068 7/1964 Matthews ...................... 318/257

Primary Examiner—Oris L. Rader
Assistant Examiner—H. Huberfeld
Attorney—Molinare, Allegretti, Newitt and Witcoff ABSTRACT: A motor control circuit for operating a motor at a high speed and a substantially slower speed than the high speed which includes a plurality of relay operated switches which are selectively operated to operate the motor either in the fast forward or reverse directions or in the slow forward or reverse directions. A zero speed switch acts in conjunction with a time delay switch to operate the motor in the slow forward or reverse direction by continuously shutting off and starting the motor. The motor may be of the dual rotor AC induction-type and relay circuitry is provided to rapidly decrease the speed of the motor from the high speed to the slower speed by reversing the motor.

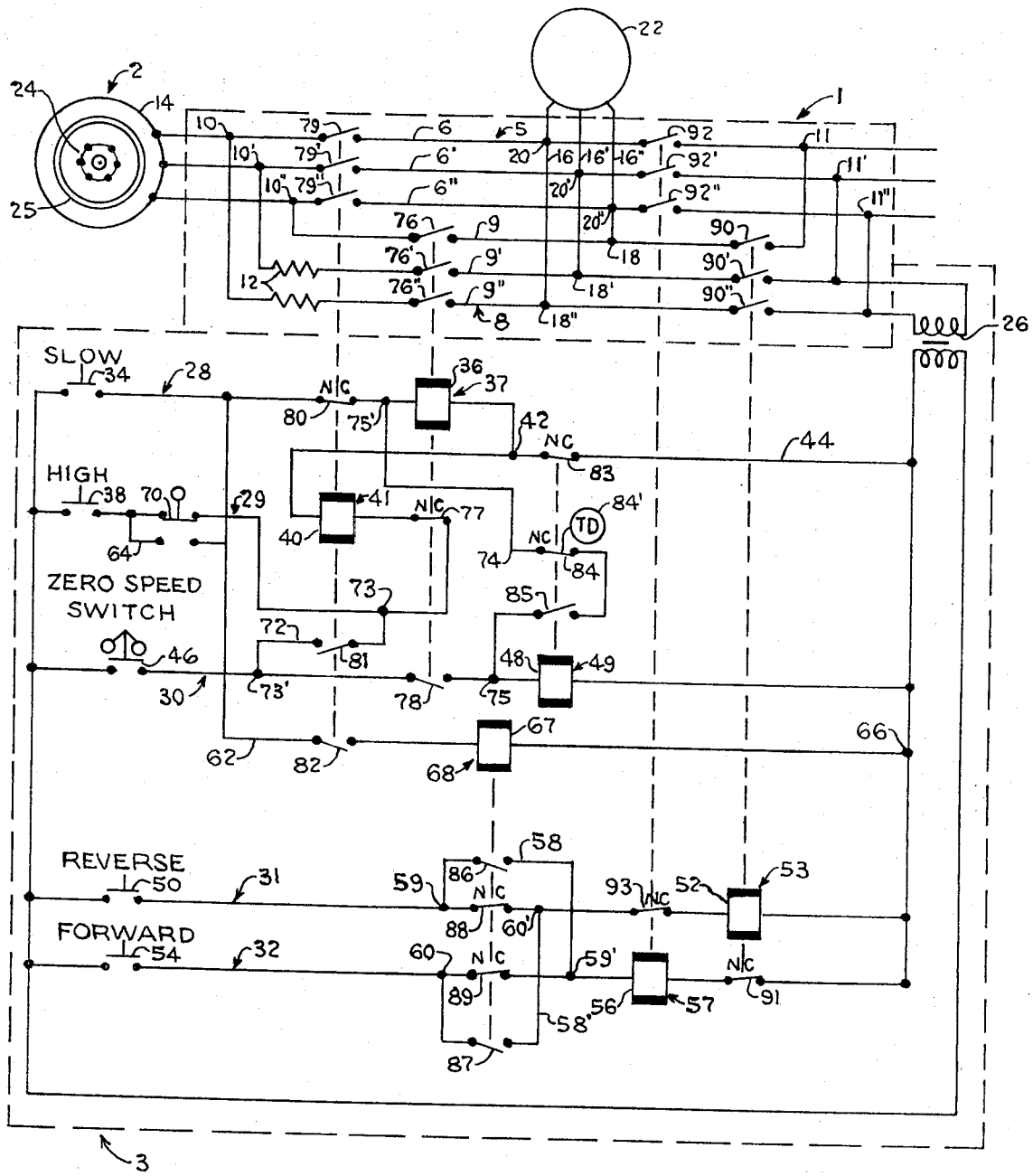

DUAL SPEED MOTOR CONTROL

BACKGROUND OF THE INVENTION

This invention relates to dual speed motor control and, more particularly, to an AC induction motor control arrangement for operating the motor at high and low speeds.

One of the characteristics of AC induction motors is that such motors are generally designed to operate at a constant speed. When it is necessary to operate such motors at plural speeds, the motor is usually redesigned so as to provide, in effect, multiple stators of varied turns or must be otherwise modified so as to provide for variation of the stator flux to attain the various speeds. Speed variation of AC induction motors has also been realized in the past by employing mechanical means, for example by providing a brake for mechanically braking the motor shaft to slow the motor to the slower speed.

The prior methods of varying speed are cumbersome and are generally unsuitable where the motor must be capable of operation at both a relatively high speed and also at a slow speed which is substantially less than the normal high speed to enable precise positioning of the loads. By way of example, such characteristics are highly desirable where the motor is to be employed as a horizontal drive motor for a relatively heavy load carrier of the type disclosed in the copending U.S. Pat. applications Ser. No. 737,199 and No. 766,673, filed June 14, 1968 and Oct. 11, 1968 respectively and both assigned to the same assignee as the instant application. In such load carriers, it is desirable that the load carrier by operable at least at two distinct speeds; a first relatively high speed for rapidly moving the carrier over its intermediate length of travel between the load pickup and delivery station or stations and the storage or retrieval station and a second substantially slow inching speed for inching the load carrier into accurate and precise alignment with each of the aforementioned stations when the load carrier arrives in the vicinity of the stations.

The dual speed motor control of my invention is capable of providing both high speed operation of the motor as well as operation at extremely slow speeds. My dual speed control enables an AC induction motor to be readily adapted for moving heavy loads, such as load carriers and the like, within wide speed ranges whereby both high speed operation and precise positioning are realized. The dual speed control of my invention may be employed to operate the motor at either fast or slow speeds and in either the forward or reverse direction at said speeds. In addition, the dual speed control of my invention is capable of rapidly reducing the speed of the motor from the fast speed to the slow speed by reversal of the motor. The dual speed control of my invention employs a zero speed switch and time delay switch which continuously and successively turns the motor on and off to achieve a slow inching speed which is capable of precise positioning.

These and other objects, features and advantages of the present invention will be more clearly understood through a consideration of the following detailed description.

BRIEF DESCRIPTION OF THE DRAWING

In the course of this description, reference will frequently be made to the attached drawing in which a preferred embodiment of the control circuit of my invention is shown.

DESCRIPTION OF THE PREFERRED EMBODIMENT

As shown in the drawing, the circuit of my invention comprises generally a power supply circuit 1 for supplying power to an AC induction motor 2 and a control circuit 3.

The power circuit 1 is of the three phase, three wire-type having a high speed branch 5 formed by conductors 6, 6' and 6" and a low speed branch 8 formed by conductors 9, 9' and 9". The conductors 9, 9' and 9" of the low speed branch 8 are connected at junctions 10", 10' and 10, respectively in reverse order, and at 11, 11' and 11" to the conductors 6, 6' and 6" of the high speed branch 5. Two of the conductors 9' and 9" of the low speed branch include resistors 12 therein for reducing the voltage which is supplied to the stator 14 of the motor 2. Leads 16, 16' and 16" are also connected in reverse order at junctions 18", 18' and 18 to the conductors 9", 9' and 9 respectively of the low speed branch 8 and at junctions 20, 20' and 20" to conductors 6, 6' and 6" respectively of the high speed branch 5, the purpose of the leads being to provide opposite rotation of the motor 2 as will be described more fully hereinafter. If desired, an electric brake 22 may be electrically connected to leads, 16, 16' and 16" for braking the shaft of the motor 2 when the motor is stopped. Such braking would be desirable where the motor is employed as the horizontal drive motor of the aforementioned load carrier when the load carrier is stopped.

The motor 2 is preferably a dual rotor AC induction motor which includes the stator 14, a conventional solid cylinder rotor 24 which is driven by the conventional alternating flux produced by the stator, and a freely rotating rotor 25 between the stator and the rotor 24 which slips between the stator and rotor when the motor is accelerating or decelerating between speeds. Such dual stator motors have been employed in the past to provide for relatively smooth acceleration and deceleration.

The control circuit 3 is provided with electrical energy preferably by way of a conventional stepdown transformer 26 connected across two of the conductors, for example conductors 9' and 9" of the power circuit. In general the control circuit includes five branches, a slow speed branch 28, a high speed branch 29, a speed switch branch 30, a reverse branch 31 and a forward branch 32.

A slow speed operating switch 34, preferably of the push button-type, is located in the slow branch 28 along with the operating coil 36 of a relay 37. A high speed operating switch 38, also preferably of the push button-type, is located in the high speed branch 29 along with the operating coil 40 of a relay 41. The slow and high speed branches 28 and 29 are connected at junction 42 to the return conductor 44 to complete the circuit through the branches.

A zero speed switch 46 is located in the branch 30 along with the operating coil 48 of a relay 49. The zero speed switch 46 is mechanically coupled to the motor 2 and is operable to open and close in response to the speed of the motor.

A reverse operating switch 50, also preferably of the push button-type, is located in the reverse branch 31 along with the operating coil 52 of a relay 53. A forward operating switch 54, also preferably of the push button-type, is located in the forward branch 32 along with the operating coil 56 of a relay 57. Cross connect leads 58 and 58' are respectively joined at junctions 59 and 59' between the reverse and forward branches and at junctions 60 and 60' between the forward and reverse branches.

A lead 62 is provided between both the slow speed branch 28 and a lead 64 from the high speed branch 29 and the return conductor at junction 66. The operating coil 67 of a relay 68 is located in the lead 62. An end of aisle slowdown switch 70, which is mechanically operated by the aforementioned load carrier when the load carrier approaches the ends of its run, for example the end of the aisle in which it operates, is positioned in the high speed branch 29 to selectively make or break the circuit of the high speed branch 29 or the circuit between the high speed branch and the lead 62.

A lead 72 also interconnects the speed switch branch 30 and the high speed branch 29 at junctions 73 and 73'. In addition, a lead 74 also extends between junction 75 in the speed switch branch 30 and junction 75' in the slow speed branch 28 to interconnect the branches.

Relay 37 in the slow speed branch operates a plurality of switches; normally open switches 76, 76' and 76" in the conductors 9, 9' and 9" of the low speed power branch 8, a normally closed switch 77 in the high speed branch 29, and a normally open switch 78 in the speed switch branch 30.

Relay 41 in the high speed branch operates normally open switches 79, 79' and 79" in the conductors 6, 6' and 6" of high speed power supply branch 5, normally closed switch 80 in the slow speed branch 28, and normally open switches 81 and 82 in the leads 72 and 62 respectively.

Relay 49 in the speed switch branch operates normally closed switch 83 in the return conductor 44 of the slow and high speed branches, and both a normally closed time delay switch 84 and a normally open switch 85 in lead 74. Switch 84 includes time delay means 84' which may take the form of a dash pot or the like, which delays the response of the switch to the actuation of the relay coil 48 for the purpose which will be more fully described in the description of operation of the invention.

Relay 68 in lead 62 operates normally open switches 86 and 87 in the cross connect leads 58 and 58' and normally closed switches 88 and 89 in the reverse and forward branches 31 and 32 respectively.

Relay 53 operates switches 90, 90' and 90" in conductors 9, 9' and 9" of the low speed power branch 8 and normally closed switch 91 in the forward branch 32. Relay 57 operates normally open switches 92, 92' and 92" in the conductors 6, 6' and 6" of the high speed power branch 5 and normally closed switch 93 in the reverse branch 31.

The operation of the invention will now be described with particular reference to the operation of a load carrier of the type previously referred to. To commence the description, it will be assumed that the load carrier is initially stopped at one of the pickup and delivery stations.

In the stopped position, a suitable stop switch (not shown) may be opened to open the circuit between junctions 10, 10' and 10" and the motor 2 to deenergize the motor. To prevent undesirable rolling or other movement of the load carrier when the load carrier is stopped, the brake 22 may be energized through leads 16, 16' and 16" from either the high or low speed power supply branches 5 or 8 to engage the motor drive shaft.

Let us now assume that it is desired to move the load carrier down the aisle in the forward direction toward a load storage bin. The brake 22 is disengaged and the high speed operating switch 38 and the forward switch 54 are closed. Closing the high speed switch completes a circuit through the high speed branch 29; through the high speed switch 38, the already closed end of aisle slowdown switch 70, the normally closed switch 77 of relay 37, the relay operating coil 40 of relay 41, junction 42, normally closed switch 83 of relay 49, and return conductor 44. Upon completion of the circuit, the coil 40 of relay 41 is energized closing switches 79, 79' and 79", opening normally closed switch 80 in the slow speed branch 28, and closing switches 81 and 82 in leads 72 and 62 respectively.

The closing of the forward switch 54 completes a circuit through the forward branch 32; through switch 54, normally closed switch 89, coil 56 of relay 57, and normally closed switch 91 of relay 53. Completion of the circuit through the forward branch 32 energizes coil 56 of relay 57 to close switches 92, 92' and 92" and open normally closed switch 93 in the reverse branch 31.

The zero speed switch 46 in branch 30 is set to close only when the motor reaches a certain predetermined speed. Since the load carrier at this point is stopped, the motor 2 is not yet rotating and the zero speed switch is therefore open deenergizing speed switch branch 30. Since branch 30 is deenergized, coil 48 of relay 49 is also deenergized opening switch 85 to break the circuit through lead 74 and closing normally closed switch 83. The opening of switch 80 upon energizing coil 40 of relay 41 will deenergize the coil 36 of relay 37 causing switches 76, 76' and 76" to be opened. In addition, switches 90, 90' and 90" are also open since the coil 52 of relay 53 is deenergized due to the opening of switch 93 and open reverse operating switch 50.

At this time, power will now be supplied to the stator 14 of the motor at full line voltage through the high speed power supply branch 5; a circuit being completed through conductors 6, 6' and 6", switches 92, 92' and 92" and switches 79, 79' and 79".

Since the motor is of a dual rotor construction in which the freely rotating rotor 25 slips upon starting up, the acceleration of the motor up to full speed will be somewhat gradual reducing the likelihood of damage to the load being carried by the load carrier.

As the motor comes up to speed, the zero speed switch 46 is actuated to close when the speed of the motor has reached the predetermined setting of the zero speed switch, which may be by way of example somewhere in the vicinity of 50 to 200 r.p.m. The closing of the speed switch, however at this point, will not change the operation of the motor since switch 78 remains open so long as coil 36 of relay 37 is deenergized. Therefore, coil 48 of relay 49 still remains deenergized. However, the closing of switch 46 acts to now additionally energize coil 40 of relay 41 by way of the circuit which is completed through closed speed switch 46, junction 73', lead 72 and its previously closed switch 81, and junction 73. Thus the motor will continue to operate at high speed.

Let us now assume that the load carrier has moved down the aisle at high speed and is approaching the vicinity of the desired storage bin. At this point, the speed of the load carrier must be reduced so as to precisely and accurately inch the load carrier into its finally aligned position with the storage bin to enable insertion into or removal of the load. To realize such change to inching speed, the slow speed operating switch 34 is closed and the high speed operating switch 38 is opened. If desired, switches 34 and 38 may be mechanically or otherwise coupled such that the closing of one switch automatically opens the other.

Although the high speed operating switch 38 is opened, coil 40 of relay 41 still continues to be energized through the closed zero speed switch 46, junction 73', lead 72 and its previously closed switch 81, junction 73, and normally closed switch 77. Thus switches 79, 79' and 79" remain closed and switch 80 remains open to maintain coil 36 deenergized.

However, the closing of switch 34 now completes a circuit through switch 34 and lead 62, previously closed switch 82, and coil 67 of relay 68 to junction 66 to energize the coil 67. When coil 67 of relay 68 is energized, the position of switches 86, 87, 88 and 89 are reversed, thereby closing switches 86 and 87 and opening switches 88 and 89. The opening of switch 89 interrupts the circuit to coil 56 of relay 57 causing the coil to be deenergized. When coil 56 is deenergized, switches 92, 92' and 92" are opened and switch 93 is closed. The closing of switch 87 completes a circuit through the previously closed forward operating switch 54, junction 60, switch 87 of cross connect lead 58', junction 60', closed switch 93 and coil 52 of relay 53, energizing the coil. When the coil 52 is energized, switches 90, 90' and 90" close.

Now a power circuit is completed to the motor 2 respectively through conductors 6, 6' and 6", junctions 11, 11' and 11", closed switches 90, 90' and 90", junctions 18, 18' and 18", leads 16", 16' and 16, junctions 20", 20' and 20, conductors 6", 6' and 6, and previously closed switches 79", 79' and 79 to the motor. Since the junctions of the leads 16, 16' and 16" are reversed, full voltage power will continue to be supplied to motor 2 but the polarity will be reversed to cause stator flux to reverse. Reversal of the flux of the stator will cause the rotor to rapidly slow.

It will be noted that the same rapid speed reduction may be realized by way of the end of aisle slowdown limit switch 70 is the load carrier approaches the end of the aisle. The limit switch 70 may be shifted by suitable mechanical means at the end of the aisle such that the switch shifts from the position shown to open the high speed branch 29 and close the circuit through lead 64. The operation of the limit switch thus energizes lead 62 as previously described to cause motor reversal and rapid slowdown.

When the speed of the motor has slowed to the predetermined speed for which the zero speed switch 46 is set, the zero speed switch will open. Since after the high speed operating switch 38 was opened, the coil 40 of relay 41 has been supplied only through the circuit established through the closed zero speed switch and switch 81, coil 41 will now become deenergized.

When coil 40 of relay 41 is deenergized, switches 79, 79' and 79'' will open, switch 80 in the slow speed branch 28 will close, and switches 81 and 82 in leads 72 and 62 respectively will open. The opening of switch 82 will deenergize coil 67 of relay 68 closing switch 89 and opening switch 87. When switches 89 and 87 close and open respectively, coil 52 of relay 53 will again be deenergized to open switches 90, 90' and 90'' and close switch 91, and coil 56 of relay 57 will again be energized to close switches 92, 92' and 92'' and open switch 93.

Since switch 80 is closed upon the deenergizing of coil 40 of relay 41, a circuit is now completed through the slow speed branch 28; through the previously closed slow speed operating switch 34, closed switch 80, coil 36 of relay 37, junction 42, normally closed switch 83 and return conductor 44, energizing coil 36.

When coil 36 of relay 37 is energized, switches 76, 76' and 76'' are closed, switch 77 is opened, and switch 78 in the speed switch branch 30 is closed. Power is now again supplied to the motor but by way of the low speed power supply branch 8; through conductors 6, 6' and 6'', switches 92, 92' and 92'', junctions 20, 20' and 20'', leads 16, 16' and 16'', junctions 18'', 18' and 18, conductors 9'', 9' and 9, switches 76'', 76' and 76, resistors 12 in conductors 9'' and 9', and junctions 10, 10' and 10'' respectively to the stator of the motor. It will be noted that the connections of the leads 16, 16' and 16'' from the high speed to the low speed power supply branches and junctions 10, 10' and 10'' between the low and high speed power supply branches are reversed such that the net result of the low speed power supplied to the stator of the motor is power of forward polarity.

The motor will again begin to speed up until the predetermined speed is reached at which the zero speed switch 46 closes. When the zero speed switch closes, the coil 48 of relay 49 becomes energized through the circuit which is completed through the closed switch 46 and the previously closed switch 78. Energization of the coil 48 closes switch 85 and opens normally closed switch 83. The opening of switch 83 opens the slow speed branch 28 and deenergizes the coil 36 of relay 37. Deenergization of coil 36 opens switches 76, 76' and 76'' to shut off motor 2 and opens switch 78 in the speed switch branch 30.

Although switch 78 opens, the coil 48 of relay 49 continues to be energized through lead 74 since the opening of switch 84 is delayed by a predetermined amount of time by time delay means 84'. Thus coil 48 of relay 49 will remain energized through the circuit which is completed through the closed slow speed operating switch 34, switch 80, junction 75', lead 74, the time delayed closed switch 84, switch 85, and junction 75.

Since power to the motor is interrupted, its speed again will decrease to a point at which the zero speed switch 46 will again open. The delay time of the switch 84 is adjusted such that the switch will remain closed until the zero speed switch 46 has had time to open. Once the zero speed switch has opened and the time delay has timed out, switch 84 will open to break the circuit through lead 74 to the coil 48 of relay 49, deenergizing the relay. When the relay 49 is deenergized, switch 85 will open and switch 83 will again close to complete a circuit through coil 36 of relay 37. When coil 36 of relay 37 is again energized, switches 76, 76' and 76'' will close to again energize the motor through the slow speed branch and resistors 12 and the motor will speed up. Thus, the motor in the slow speed mode is continuously and successively turned on and off to inch the load carrier forward and precisely position the load carrier adjacent the storage bin.

When the load has been stored in or retrieved from the bin and positioned upon the load carrier and it is desired to return the load carrier to the delivery and pickup station, the high speed operating switch 38 is again closed and the reverse switch 50 is closed to return the load carrier at high speed in the reverse direction. The operation of the circuit in the reverse direction is substantially the same as previously described except that closing of the reverse operating switch 50 completes a circuit through branch 31 by way of the closed switches 50, 88 and 93 to energize coil 52 of relay 53. When coil 52 of relay 53 is energized, switch 91 in the forward branch 32 will open to break the circuit in that branch and switches 90, 90' and 90'' will close. Thus a power circuit is now completed through conductors 6, 6' and 6'', junctions 11, 11' and 11'', conductors 9, 9' and 9'', switches 90, 90' and 90'', junctions 18, 18' and 18'', leads 16'', 16' and 16, junctions 20'', 20' and 20, switches 79'', 79' and 79 through leads 6'', 6' and 6 to the stator of the motor to operate the motor at high speed in a direction opposite to that previously described.

The sequence of operation upon slowing the load carrier from high speed to slow speed is substantially the same as that previously described.

It will be appreciated that although my invention has been described in terms of relays and the like, suitable solid state circuitry could be employed to practice my invention by one skilled in the art. In addition, one or more of the operating switches 34, 38, 50 or 54, rather than being of the manual push button-type, might be automatically or remotely controlled.

It should also be understood that the embodiment of the invention which has been described is merely illustrative of one of the applications of the principles of the invention. Numerous modifications may be made by those skilled in the art without departing from the true spirit and scope of the invention.

What I claim is:

1. A motor circuit for operating an AC induction motor at a high speed and at a speed which is substantially slower than said high speed, said circuit comprising:
   first and second power supply conductor means for supplying said motor with high and lower voltage power, respectively,
   a control circuit having a first slow speed branch, a second high speed branch and a third branch, said first and second branches including slow and high speed operating switch means, respectively,
   speed switch means in said third branch which close in response to the speed of said motor when said speed increases above a predetermined speed,
   first, second and third switching means operable by said first, second and third branches, respectively, when the circuit through said branches is completed,
   said first switching means including means which completes a circuit in said second conductor means and said third branch when said first switching means is energized,
   said second switching means including means which completes a circuit in said first conductor means and breaks the circuit in said first branch when said second switching means is energized,
   said third switching means including means which breaks the circuit in said first branch and completes a circuit between said first and third branches when said third switching means is energized, and
   time delay means associated with said third switching means for maintaining said third switching means energized for a predetermined time after said speed switch means opens, said time delay means and said speed switch means successively opening and closing the circuit to the motor through said second conductor when the slow speed operating switch is closed.

2. The circuit of claim 1 wherein said control circuit includes
   a fourth reverse branch and a fifth forward branch, said fourth and fifth branches including reverse and forward operating switch means, and fourth and fifth switching means which are alternatively operated by said fourth and fifth branches when said branches are energized, said fourth and fifth switching means each having means for completing the circuit through said first and second conductor means and being selectively operable to reverse the direction of rotation of the motor.

3. The circuit of claim 2 including sixth switching means, switch means for energizing said sixth switching means in response to the closing of said speed switch means when the speed of said motor exceeds said predetermined speed, said sixth switching means having means which interconnects said fourth and fifth branches when said sixth switching means is energized for deenergizing one and energizing the other of said fourth and fifth switching means to reverse the motor.

4. The circuit of claim 3 wherein the switch means which is responsive to the closing of said speed switch means energizes said sixth switching means from said first branch when said slow operating switch means is closed.

5. The circuit of claim 3 including limit switch means in said second branch which energizes said sixth switching means from said second branch.

6. The circuit of claim 3 wherein said switch means which is responsive to the closing of said speed switch means is operated by said second switching means.

7. The circuit of claim 3 wherein the means of said second switching means also completes a circuit between said second switching means and said third branch when said speed switch means is closed.

8. A circuit for operating an AC induction motor at a high speed and at a speed which is substantially slower than said high speed, comprising in combination:

a dual rotor induction motor having a first rotor and a second freely spinning rotor between the stator of the motor and said first rotor, a first circuit and switching means for operating said motor at said fast speed, a second circuit and switching means for operating said motor at said substantially slower speed, said second circuit including speed switch means which are responsive to the speed of said motor to shut said motor off when the speed reaches a predetermined speed, and time delay means in said second circuit for maintaining said motor in said shut off condition for a predetermined time after the speed of said motor falls below said predetermined speed, said time delay means restarting said motor after said predetermined time has elapsed, said time delay means and said speed switch means continuously and successively turning said motor on and off at said substantially slower speed.

9. The circuit of claim 8 including a third circuit and switching means for operating said motor in opposite directions, and fourth switching means operating said third circuit and third switching means when said first and second switching means are deenergized and energized respectively for reversing said motor to rapidly slow said motor to said predetermined speed.

10. The circuit of claim 3 wherein said sixth switching means reverses said fourth and fifth switching means and the polarity of the power in said first high voltage power supply conductor means instantaneously when the high speed operating switch means are opened and the slow speed operating switch means are closed to rapidly slow the motor.